United States Patent [19]

Boyer

[11] 3,928,956
[45] Dec. 30, 1975

[54] REAR MOUNTED GRASS CATCHER
[75] Inventor: Walter J. Boyer, St. Louis, Mo.
[73] Assignee: The Perfection Manufacturing Company, St. Louis, Mo.
[22] Filed: Nov. 29, 1974
[21] Appl. No.: 528,333

[52] U.S. Cl. .............................. 56/202; 56/202 X
[51] Int. Cl.² ........................................ A01D 35/22
[58] Field of Search ............................. 56/202, 194

[56] References Cited
UNITED STATES PATENTS

| | | | |
|---|---|---|---|
| 2,777,271 | 1/1957 | Sutton | 56/202 X |
| 2,882,670 | 4/1959 | Stephens | 56/194 |
| 3,517,493 | 6/1970 | Kiteley | 56/194 |
| 3,706,190 | 12/1972 | Taub | 56/202 X |
| 3,726,069 | 4/1973 | Cope | 56/202 |

Primary Examiner—Robert Peshock
Assistant Examiner—Daniel J. Leach
Attorney, Agent, or Firm—Cohn, Powell & Hind

[57] ABSTRACT

A grass catcher for use with a lawn mower housing having a rear discharge opening provided with a hinged safety flap. The grass catcher includes a fabric bag having a peripheral frame at the front, open end and a hanger at the rear end. The peripheral frame cooperates with the mower housing to hold the safety flap in the up, open position when the grass catcher is installed, and the frame is formed into a handle to facilitate installation and removal of the catcher.

4 Claims, 5 Drawing Figures

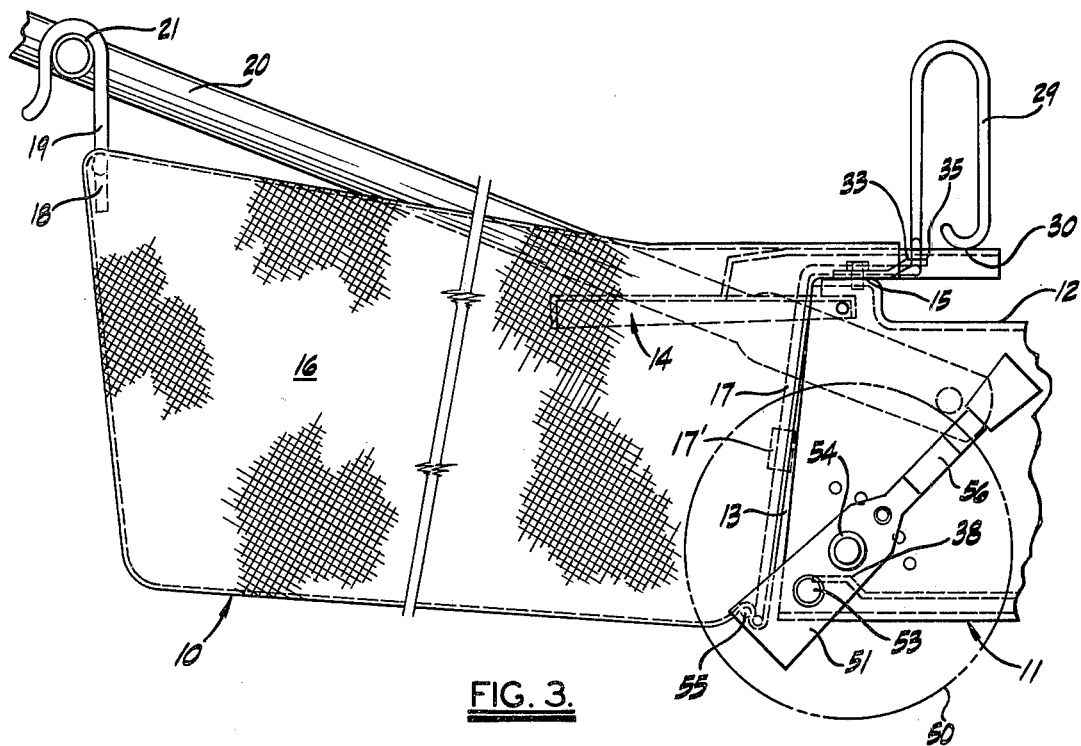
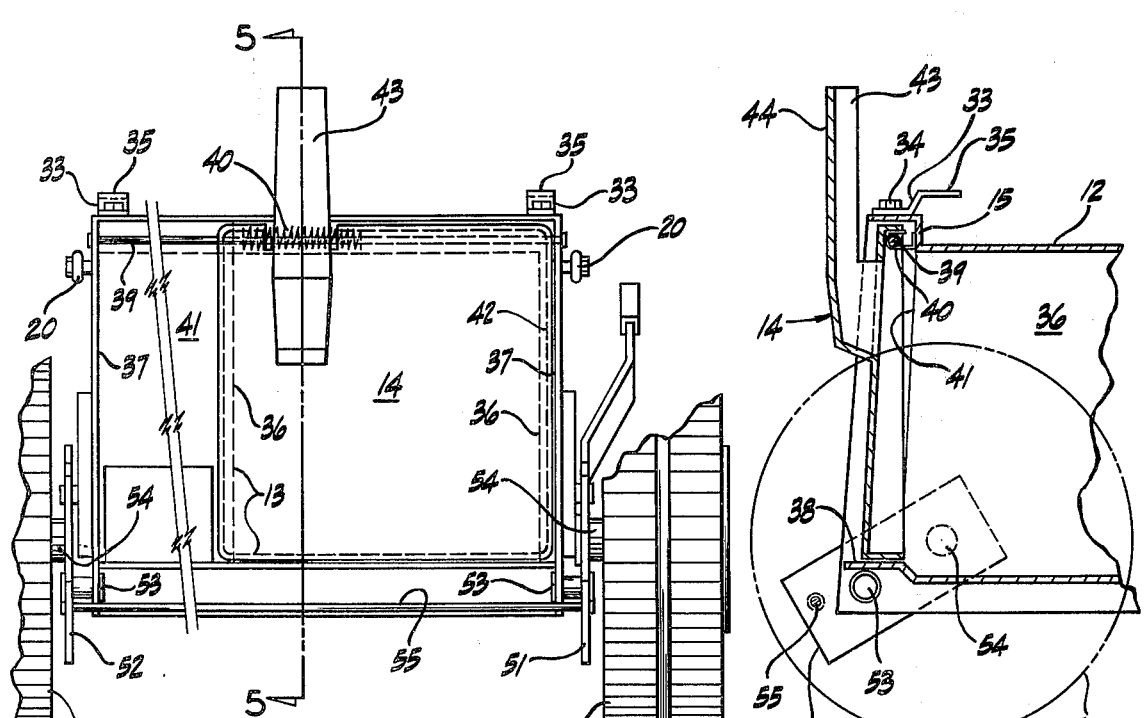

REAR MOUNTED GRASS CATCHER

BACKGROUND OF THE INVENTION

This invention relates generally to a grass catcher for use with a rear discharge lawn mower and particularly to a grass catcher which holds the safety flap in the open position when installed on the lawn mower housing.

Most lawn mowers are provided with discharge openings adapted for the installation of a grass catcher so that clippings discharged by the mower can be disposed of effectively. Conventional lawn mowers are provided with either a side discharge opening or a rear discharge opening. Side discharge mowers suffer from the distinct disadvantage that the catcher extends a considerable distance laterally of the direction of mowing and precludes close mowing on the side to which it is attached. Rear discharge mowers overcome this objection but for the sake of safety must be provided with a flap of some sort which covers the discharge opening when the catcher is not being used so that small rocks and the like will not be discharged in the vicinity of the operator.

It is obviously an advantage to provide a grass catcher which can be simply installed and which holds the safety flap in the raised position and several attempts have been made to provide a satisfactory catcher of this sort. Rigid containers are known which fulfill this function but are relatively expensive to manufacture and to ship. Fabric containers are also known but the framing which must be provided for these containers tends to be expensive and somewhat complicated.

The present device provides an improvement over the known catchers and is simple to install by one person and yet inexpensive to manufacture.

SUMMARY OF THE INVENTION

This grass catcher is for use with a lawn mower having a rearwardly disposed discharge opening provided with a hinged safety flap. The catcher is adapted to hold the safety flap in the open position when installed and to automatically release the flap when removed.

The grass catcher includes a non-rigid fabric container having a peripheral frame at the front end, by which the catcher is attached to the lawn mower housing, and a rear hanger, by which the catcher is hung from the lawn mower handle.

It is an important object of this invention to provide transversely spaced brackets attached to the lawn mower housing which include forwardly extending portions overlying the housing wall and to provide the removable grass catcher with a fabric container having an opening at one end defined by a peripheral frame, the frame including opposed side members interconnected by a transverse upper member forwardly spaced of said side members, said upper member overlying the flap lever and underlying the spaced brackets to hold the flap in the up position when the catcher is installed.

Another object is to provide the peripheral frame with an intermediate, upwardly extending handle portion facilitating installation of the catcher.

Yet another important object is to provide a rear hanger mounting means at the other end of the fabric container which is formed into a hook attachable to the lawn mower handle in spaced relation from said lawn mower housing.

Still another object is to form the peripheral framing means from a single wire element including forwardly projecting portions, interconnecting the upper member and the side members, and upwardly projecting portions forming the handle portion.

An object is to provide said rear hanger mounting means from a single wire element formed into an intermediate hook and providing transverse portions supporting the rear end of the fabric container.

An object of this invention is to provide a collapsible fabric container which is extremely simple to manufacture, efficient in operation and which can easily be installed by one person without special instructions.

BRIEF DESCRIPTION OF THE DRAWINGS

FIG. 3 is an elevational view of the grass catcher installed on a lawn mower;

FIG. 4 is a rear end view of the lawn mower with the grass catcher removed; and

FIG. 5 is a cross sectional view of the lawn mower taken on line 5—5 of FIG. 4.

DESCRIPTION OF THE PREFERRED EMBODIMENT

Figure 1:
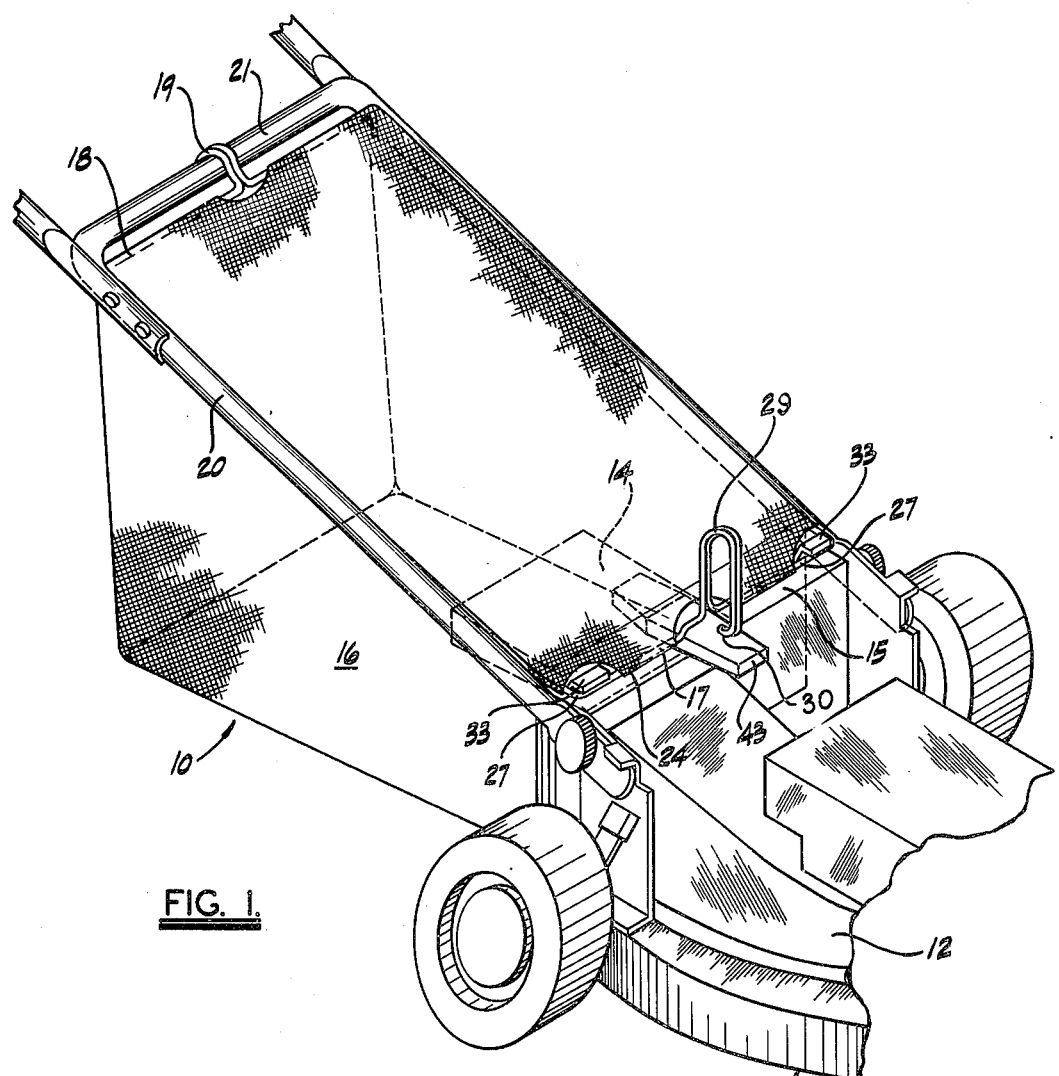
FIG. 1 is a perspective view of the grass catcher installed on a lawn mower.

Referring now by characters of reference to the drawings and first to FIGS. 1 and 3 it will be understood that the grass catcher, generally indicated by numeral 10, is intended for use with a lawn mower 11 of the type having a housing 12 which is provided with a rear discharge opening 13. The discharge opening 13 is provided with a hingedly mounted closure flap 14 connected to the housing upper wall 15, and said flap 14 is spring-biased into the closure position, shown in FIG. 5, to preclude the discharge of rocks, and the like, through the opening when the mower is used without a catcher, as shown in FIG. 4 and remains in this position until such time as the catcher 10 is installed.

The grass catcher 10 includes a catcher bag 16 which is of a fabric material and constitutes a container, and said bag 16 is provided with means at the front and rear ends for mounting the catcher 10 to the lawn mower 11. The bag 16 and therefore the catcher 10 includes an open end disposed to receive clippings from the lawn mower discharge opening 13 and, when installed, said catcher holds the safety flap 14 in the raised position by virtue of the front mounting means which is provided by a peripheral frame for said open end generally indicated by numeral 17. At its closed end, the catcher includes a rear mounting means in the form of a hanger 18 providing a hook 19, and said hook 19 is attachable to the cross bar 21 of the lawn mower handle 20.

Figure 2:
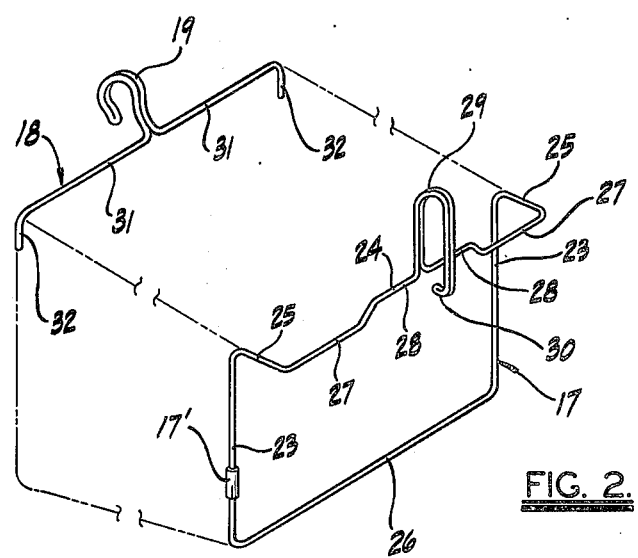
FIG. 2 is a perspective view of the grass catcher front and rear frames.

The peripheral frame 17 in the preferred embodiment is formed from a single length of wire connected at its ends by a push fit tube 17'. As clearly shown in FIGS. 2 and 3, the frame 17 includes opposed side members 23; a transverse upper member 24, which is forwardly spaced of said side members 23 by forwardly projecting members 25, and a lower member 26. Said upper member 24 includes spaced end portions 27 and relatively raised intermediate portions 28 which are formed into a handle 29 having a forward leg 30. In the preferred embodiment the rear hanger 18, by which the grass catcher 10 is attached to the lawn mower handle 20, includes elements 31 disposed on either side of the hook 19 which together extend substantially the width of the fabric bag and are provided with downwardly turned ends 32 to avoid tearing the fabric of the bag 16.

The grass catcher 10 is removably attached to the lawn mower housing 12 by means of transversely spaced clips 33, which constitute bracket means and are attached to the lawn mower housing upper wall 15 as by fasteners 34. As shown in FIGS. 3 and 5, clips 33 include forwardly extending portions 35 which overlie said housing upper wall 15 and are engageable by the end portions 27 of the peripheral frame upper member 24.

As shown in FIGS. 4 and 5, the housing discharge opening 13 is defined in a widthwise direction by sidewalls 36 and the closure flap 14 is hingedly mounted between opposed housing sidewall portions 37, extending rearwardly of said sidewalls 36, by means of a transverse rod 39. The rod 39 extends through said closure flap 14 and is provided with a spring 40, which cooperates with the housing and tends to bias the flap 14 in a counterclockwise direction into engagement with the housing front wall portions 41 and 42, extending on each side of the discharge opening 13. The closure flap 14 is provided with a flap lever 43 by which said flap can be rotated manually against the spring bias in a clockwise direction to an open position away from the housing lower wall 38. In the open position, as clearly shown in FIGS. 1 and 3, the lever 43 is disposed in overlying relation to the housing upper wall 15 so that the upper face 44 is spaced from said upper wall 15. The contoured formation of the frame upper member 24 is such that the end portions 27 are disposed below the projecting portions 35 of the housing side clips 33. With this structural arrangement of the parts the peripheral frame upper member 24 cooperates with the housing clips 33 so that the lever 43 is maintained in a depressed condition thereby holding the closure flap 14 in the open position. The forward leg 30 of the handle 29 engages and also assists in maintaining the flap 14 in the open position.

In the preferred embodiment the front peripheral frame 17 is held at the bottom as well as the top. This holding action is achieved by utilizing a transverse bar 55, which forms part of the lawn mower wheel elevation system. This wheel elevation system provides a means of elevating the rear wheels 50 and includes wheel mounting plates 51 and 52 which are pivotally mounted to the housing sidewall portions 37 by pivot pins 53. The wheels 50 are journal mounted to said mounting plates 51 and 52 by stub axles 54 and can be elevationally adjusted by a lever 56 attached to mounting plate 51 and then locked in place relative to the housing 11. The transverse bar 55 ties said mounting plates 51 and 52 together and, as shown in FIG. 3, the lower member of the peripheral frame lower member 26 is disposed in the operational installed condition between said transverse bar 55 and the rear edge of the lawn mower bottom wall 38.

The grass catcher 10 is installed as follows: the catcher is held at the ends by means of the hook 19 and the handle 29. The rear end is installed by simply hooking the hook 19 over the cross bar 20. The front end is installed by inserting the lower frame member 26 between the transverse bar 55 and, using the handle 29 to rotate the flap 14 into the open position, by moving the upper frame member 24 first forwardly of the housing side clips 33 and then downwardly and rearwardly until the end portions 27 are disposed under the overlying portions 35 of said clips. Because of the front frame forwardly projecting members 25 the weight of the catcher 10 tends to urge the upper member 24 upwardly against the clips 33 which assists in holding the catcher 10 in place. In addition, the tendency of the flap lever 43 is to move upwardly which further assists in holding said upper frame member 24 in place.

The grass catcher 10 is removed by grasping the hook 19 and the handle 29 and pushing the handle 29 slightly forward until the upper member 24 as a whole moves out of engagement with clips 33. The catcher 10 can then be lifted clear of the housing and, when this is accomplished, the flap 14 will fall automatically into the closed, safety position and remains in this position until the grass catcher 10 is once again installed.

I claim as my invention:

1. In combination with a lawn mower housing of the type having a rearwardly extending handle and including a rear discharge opening, an upper wall and a hingedly mounted closure flap, said closure flap having a lever disposed above the upper wall for rotating the flap into an open condition in which the lever overlies the housing upper wall, a grass catcher and mounting assembly comprising:
   a. bracket means attached to the housing and including transversely spaced forwardly extending portions overlying the housing upper wall,
   b. a removable grass catcher including:
      1. a fabric container having an opening at one end adapted to receive clippings through the discharge opening,
      2. front mounting means including front framing means for said opening, said framing means including opposed side members and a transverse upper member spaced forwardly of said side members, said upper member having an intermediate portion disposed in operatively overlying relation with said flap lever and transversely spaced end portions disposed in operatively underlying relation with said bracket forwardly extending portions, said upper member intermediate portion providing an upwardly extending handle portion to facilitate installation of said catcher, and
      3. rear mounting means at said other end attachable to the lawn mower handle in spaced relation from said lawn mower housing.

2. A catcher as defined in claim 1, in which:
   c. the front framing means includes a single wire element formed into a substantially peripherally continuous open frame and said handle portion.

3. A grass catcher as defined in claim 2, in which:
   d. said single wire element provides the upper member, the side members and forwardly projecting members interconnecting said upper member and said side members, and said upper member is formed into a U-shaped handle portion having a forwardly disposed leg engageable with said flap lever to maintain said flap in the open position.

4. A grass catcher as defined in claim 3, in which:
   e. said rear mounting means includes a separate single wire element formed into an intermediate hook element and providing transverse portions supporting the rear end of the fabric container.

* * * * *